July 5, 1932.   C. H. ALLEN ET AL   1,866,497
SAUSAGE TWISTING MACHINE
Filed Dec. 26, 1929   11 Sheets-Sheet 2

INVENTORS:
Charles H. Allen &
Edward J. Robbeloth
by Ralph Donath and
Paul Purchard
Attorneys.

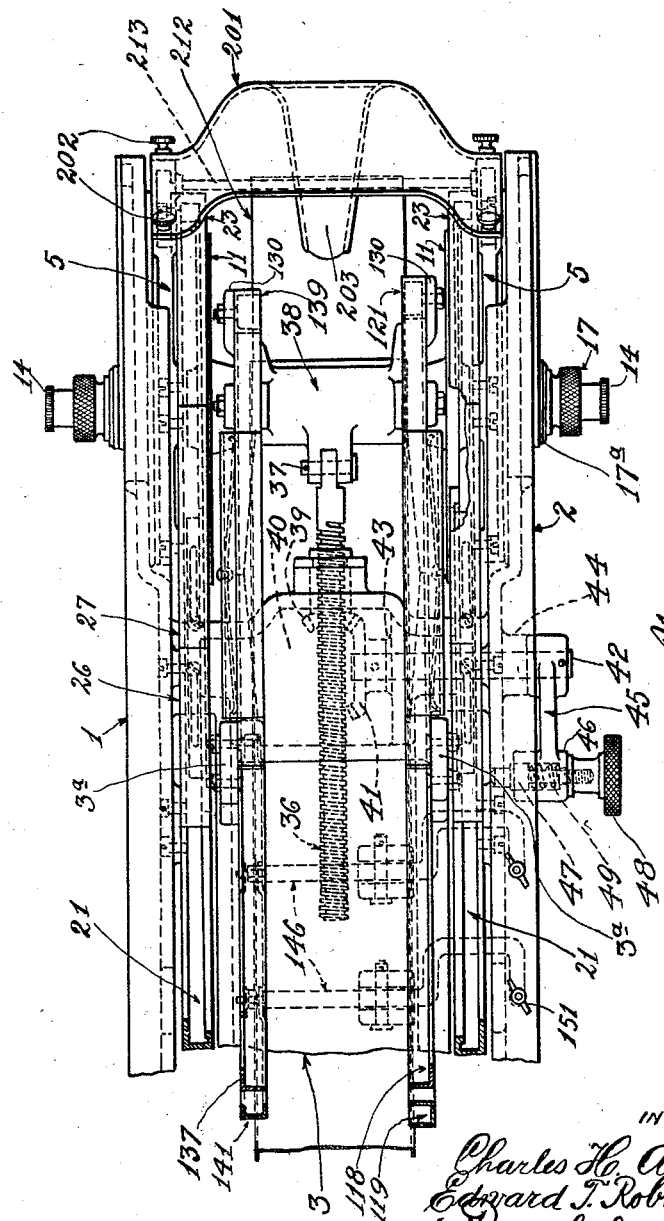

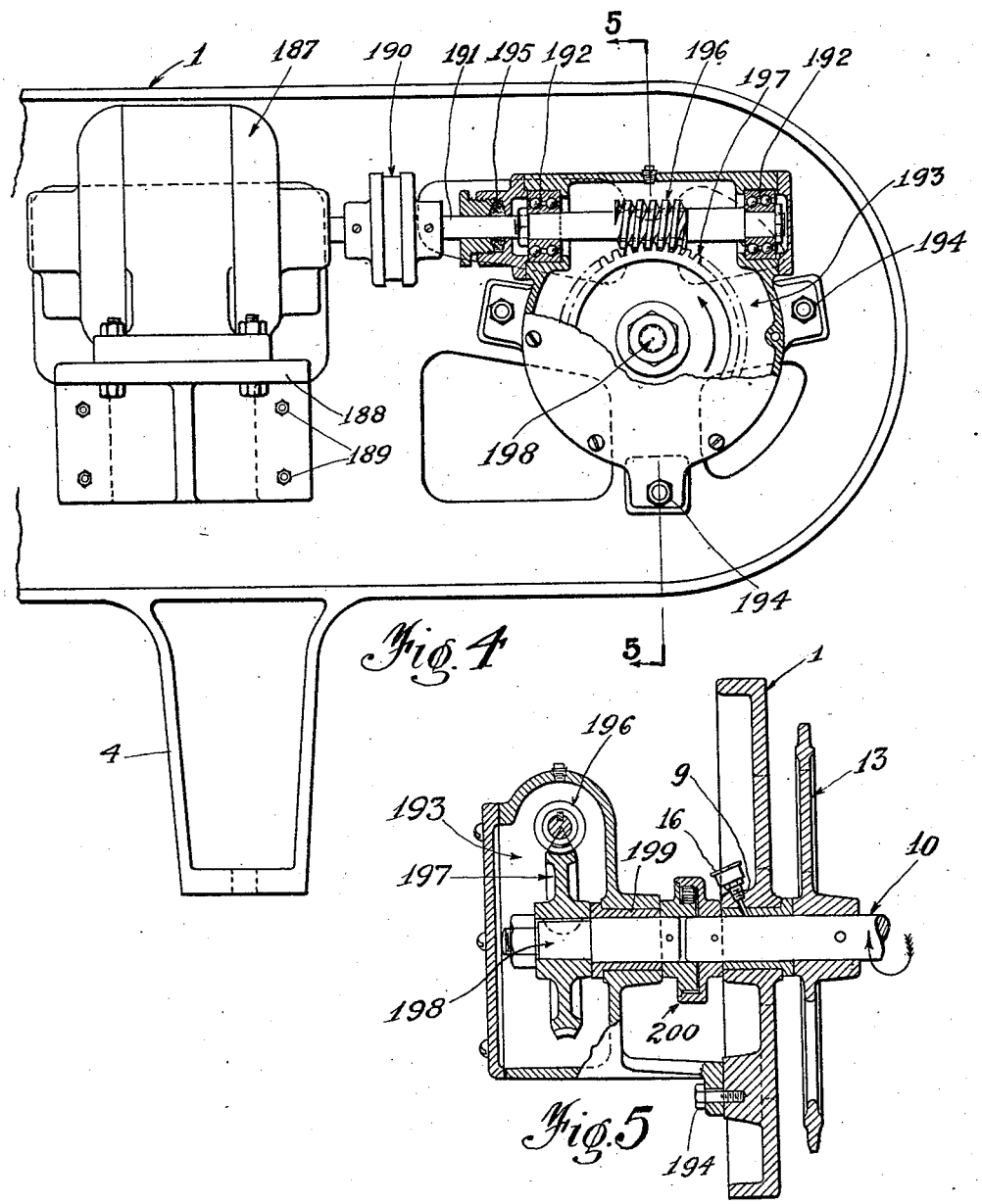

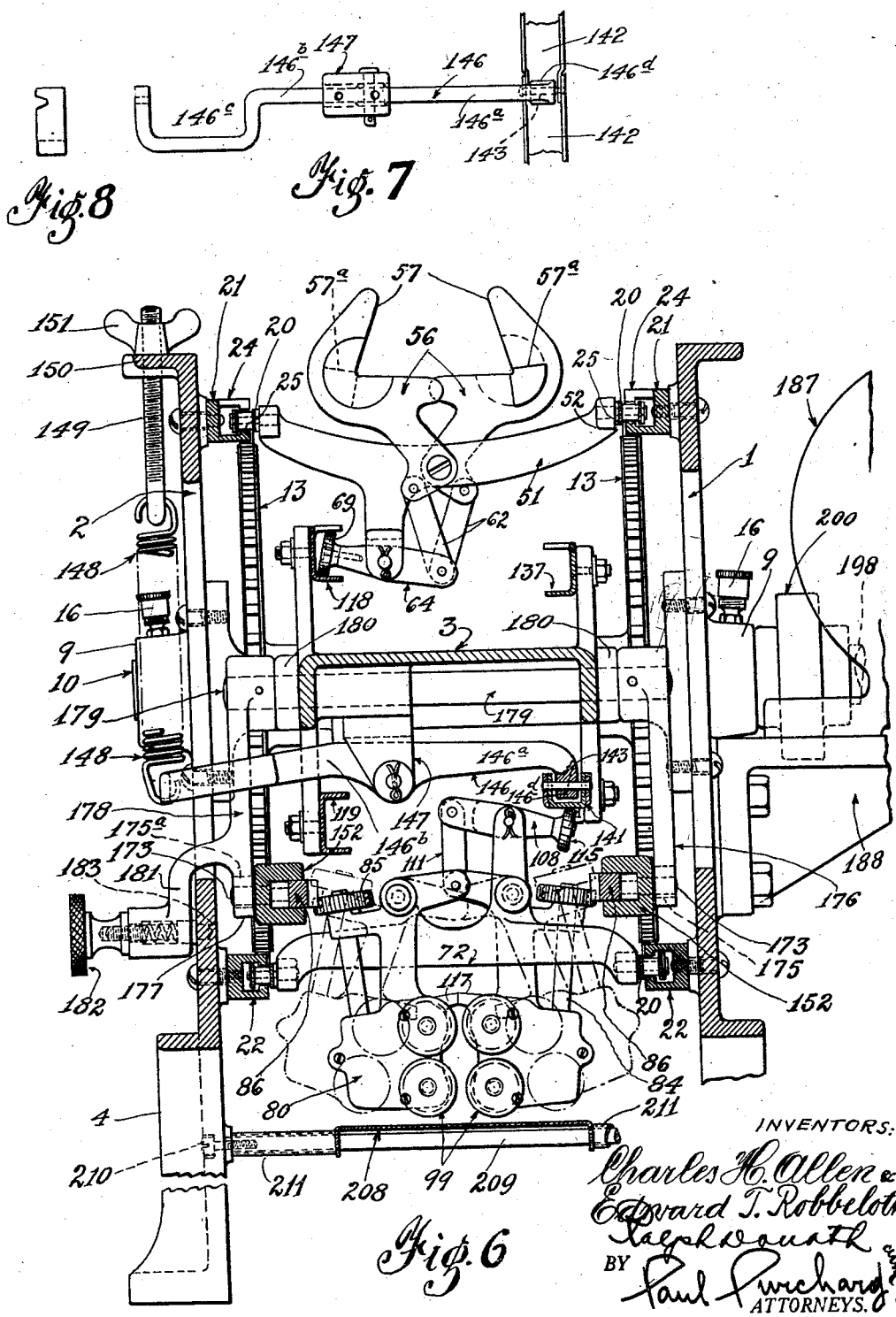

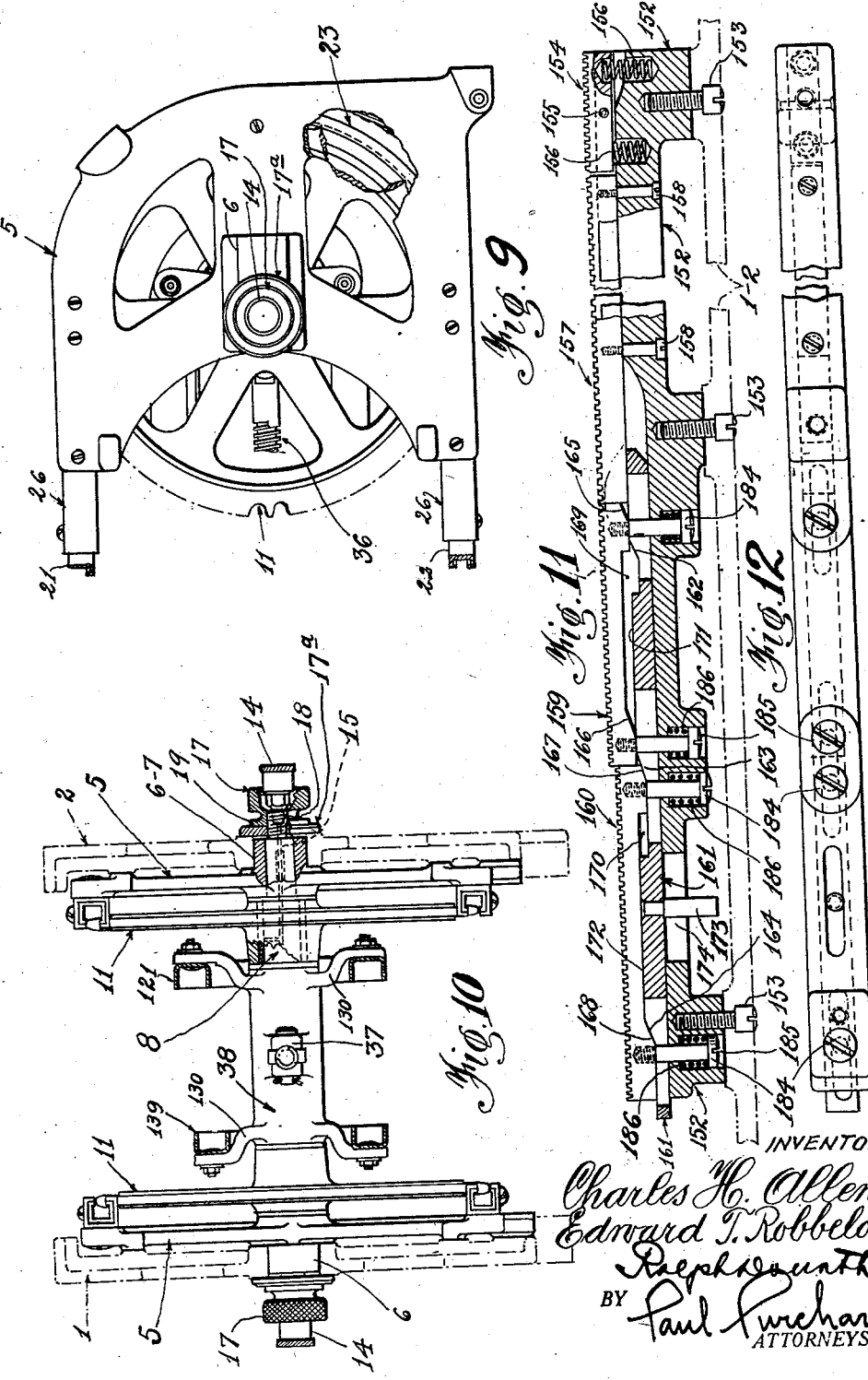

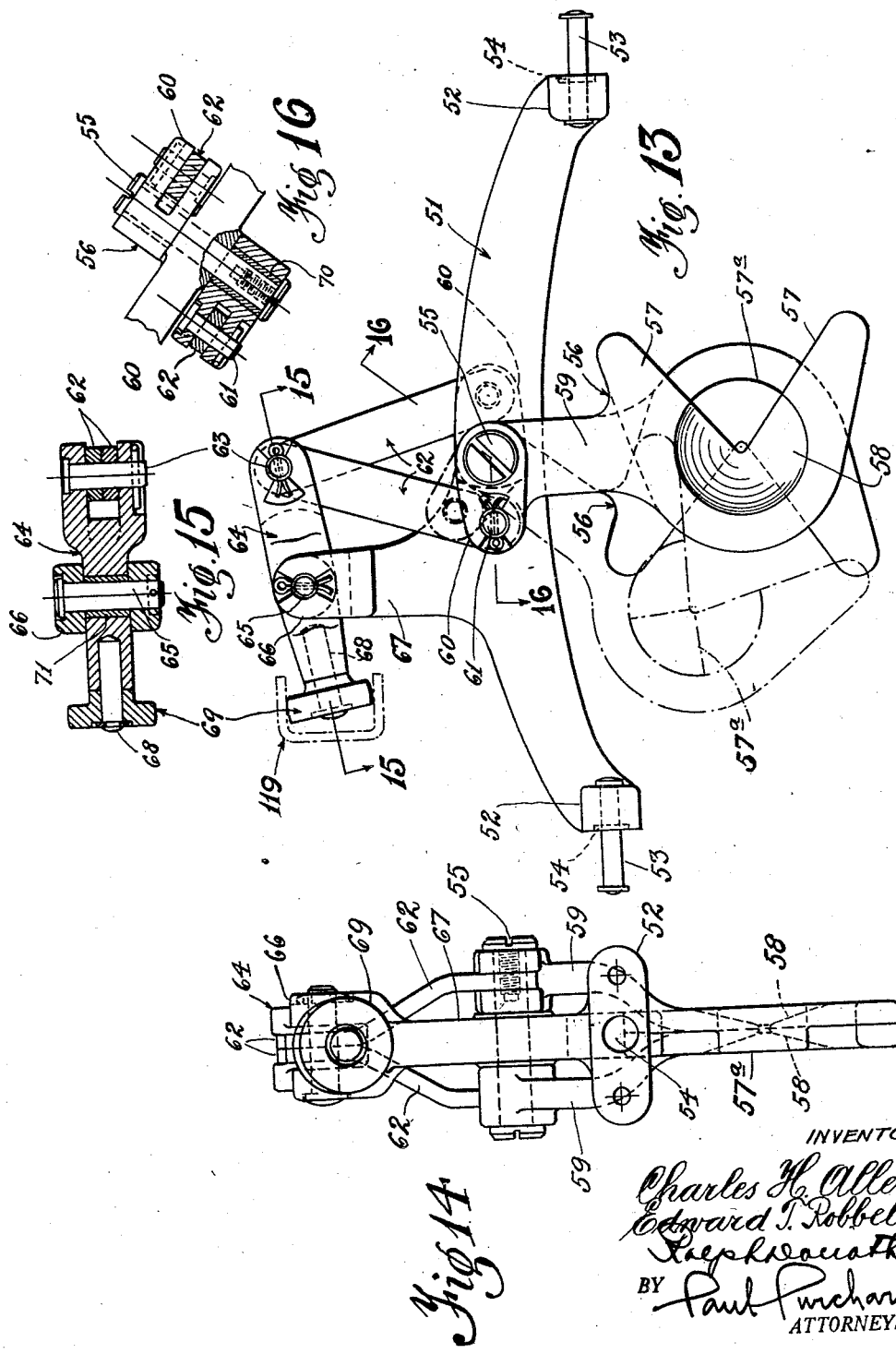

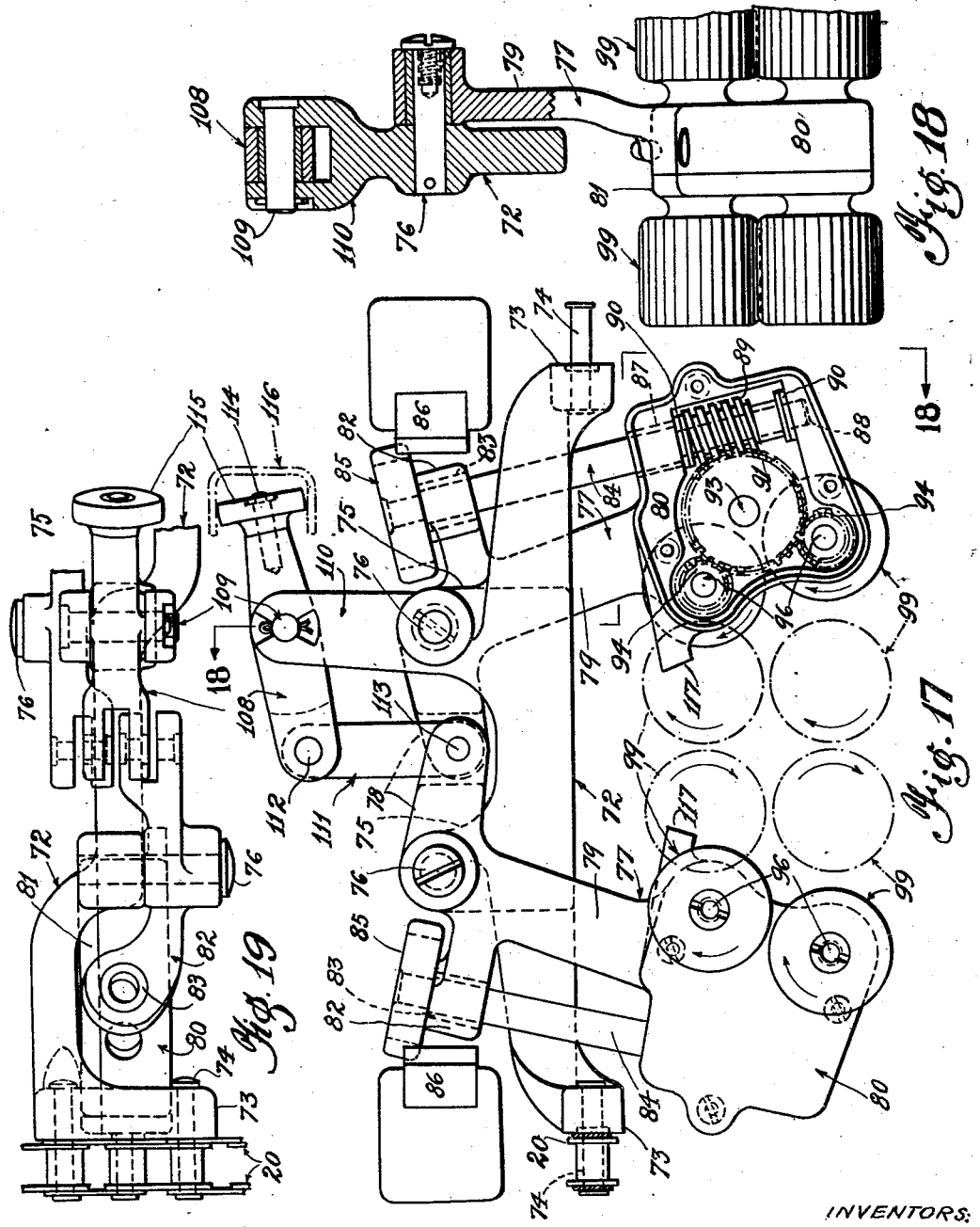

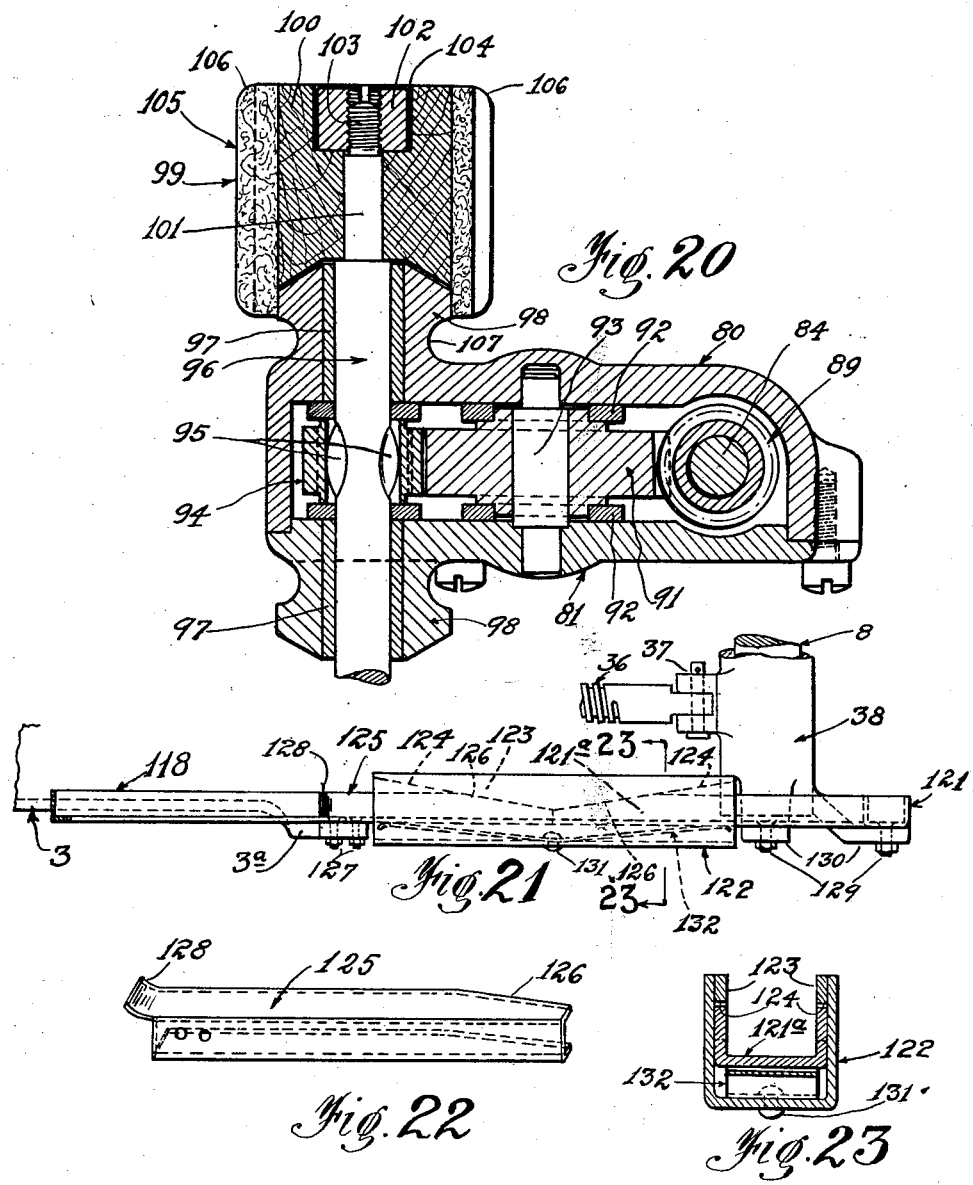

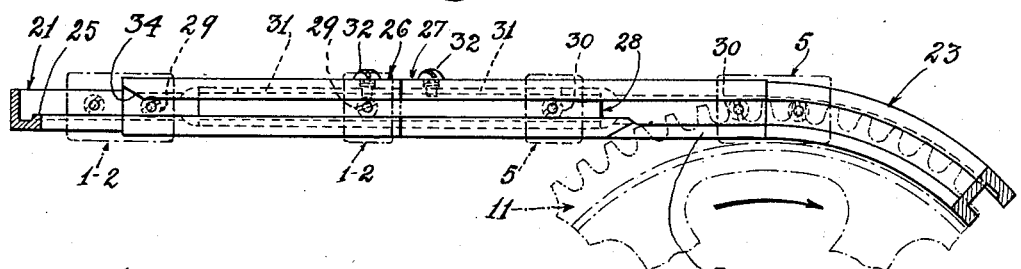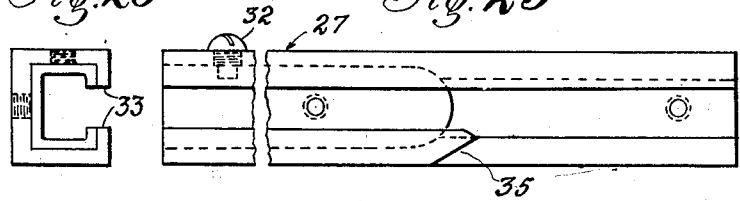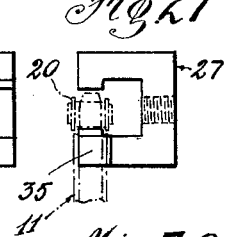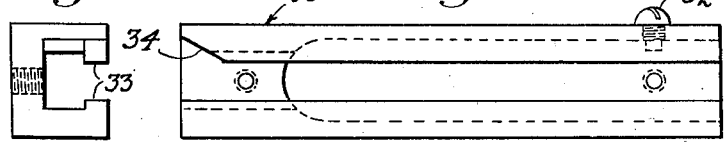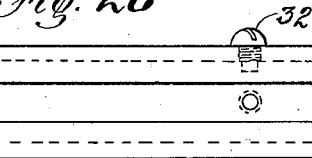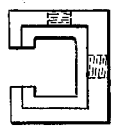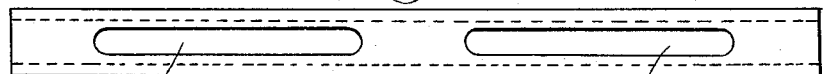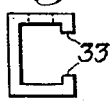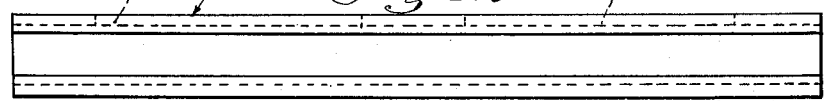

July 5, 1932.　　C. H. ALLEN ET AL　　1,866,497
SAUSAGE TWISTING MACHINE
Filed Dec. 26, 1929　　11 Sheets-Sheet 11
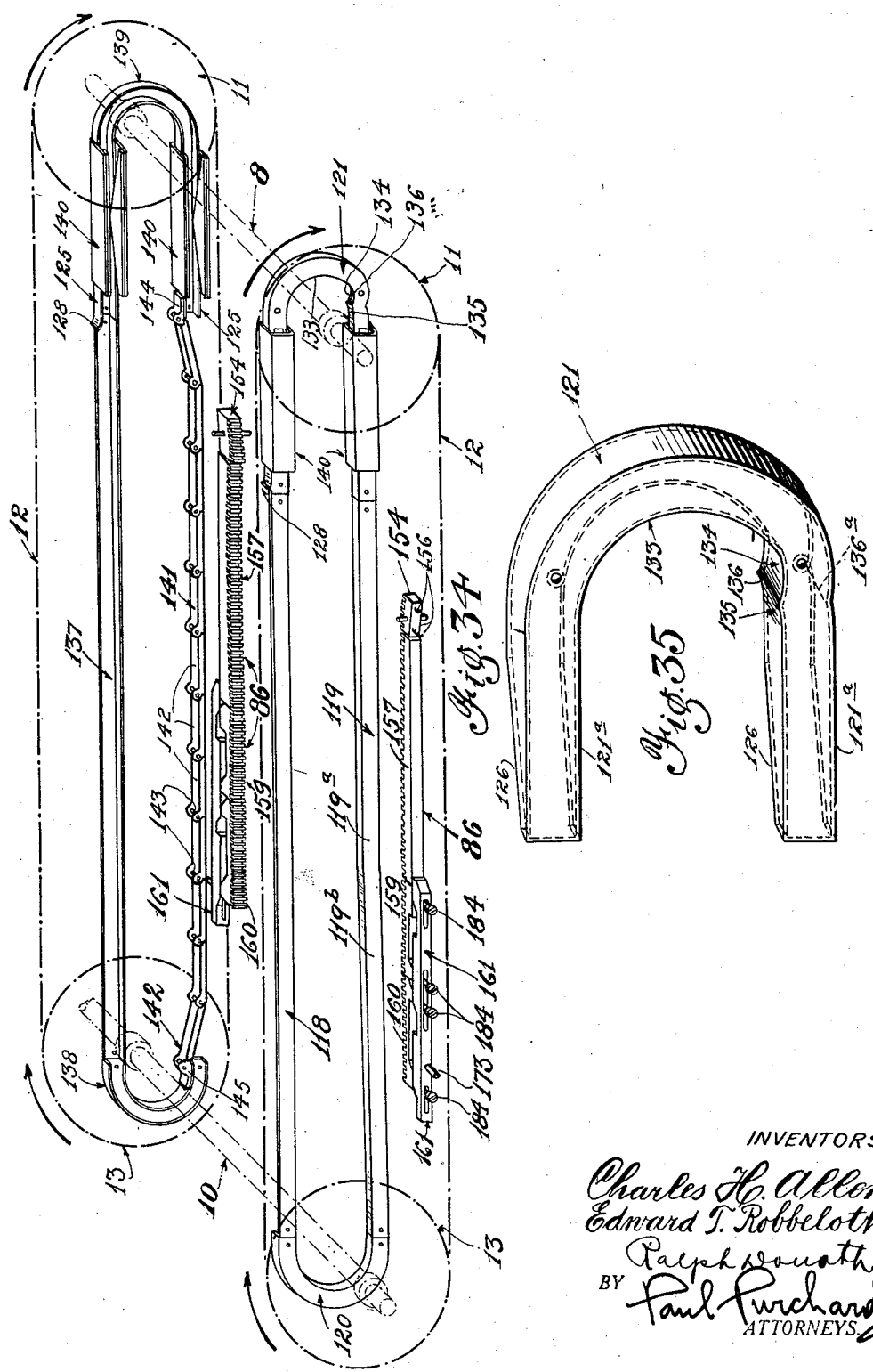
INVENTORS:
Charles H. Allen &
Edward T. Robbeloth
Ralph Donath
BY Paul Purchard
ATTORNEYS Patented July 5, 1932

1,866,497

UNITED STATES PATENT OFFICE

CHARLES H. ALLEN AND EDWARD T. ROBBELOTH, OF PITTSBURGH, PENNSYLVANIA, ASSIGNORS TO PACKERS SPECIALTY COMPANY, OF PITTSBURGH, PENNSYLVANIA, A CORPORATION OF PENNSYLVANIA

SAUSAGE TWISTING MACHINE

Application filed December 26, 1929. Serial No. 416,475.

This invention relates to sausage twisting or linking machines.

The primary object of this invention is to provide a machine for automatically dividing a filled sausage-casing into sausages of a specified length and tying said individual sausages by means of the twisting process used nowadays on most types of smaller sausages, such as the so-called wieners, Frankfurters, pork sausage, and so forth. Another object of this invention is the provision of a machine which is adapted to operate on the finest kinds of sausage-casings without injuring them and which is adapted to do the work of several persons with greater uniformity and perfection. A further object is to provide an automatic sausage linking machine in which the sausage pinching and the twisting elements are mounted on a single set of endless chains, and which is adapted to make and twist sausage-links of various lengths. A still further object of this invention is to provide in a machine of this kind means whereby the number of twists imparted to the sausage-links by the twisting-rollers and the pressure exerted by the latter may be regulated to suit the kind of casing used and the diameter thereof. Yet another object is to provide an automatic sausage linking machine which is relatively simple in construction, very sanitary in so far that it reduces handling of such goods by human hands to a minimum, which is sufficiently light in weight to be transported about by two men, which affords a very great saving of floor space as compared with the present method of manual twisting.

Additional features and advantages of this invention, as well as special novel improvements introduced in the construction of various elements of the machine, will appear from the following description considered in connection with the accompanying drawings forming a part of this application, and in which:

Fig. 3 is a fragmentary top plan view of the machine, showing the feeding end thereof, the sausage pinching and the twisting elements being omitted.

Fig. 4 is a fragmentary view, partly in section, showing the operating mechanism at the right hand side of the machine, as seen from the feeding end.

Fig. 5 is a fragmentary cross-sectional view taken on line 5—5 in Fig. 4.

Fig. 6 is an enlarged cross-section through the sausage linking machine, taken on line 6—6 in Fig. 2.

Fig. 7 is a top view of a spring actuated pressure-lever shown in Fig. 6.

Fig. 8 is an end view of said lever.

Fig. 9 is a side elevation of the so-called sliding-frame which supports the front sprockets of the chain-conveyor of the machine.

Fig. 10 is an end elevation of Fig. 9, some parts being shown in section.

Fig. 11 is a longitudinal section through one of the racks which operate the sausage twisting rollers of the machine.

Fig. 12 is a rear side elevation of Fig. 11.

Fig. 13 represents a front elevation of one of the pinching sets of the machine.

Fig. 14 is a side elevation of Fig. 13.

Fig. 15 shows a section taken on line 15—15 in Fig. 13.

Fig. 16 is a fragmentary section taken on line 16—16, Fig. 13.

Fig. 17 is a front elevation of one of the sausage twisting sets of the machine.

Fig. 18 is a section taken on line 18—18 in Fig. 17.

Fig. 19 is a fragmentary top view of Fig. 17, some parts being omitted.

Fig. 20 is an enlarged sectional view showing the construction of the twisting-rollers and driving mechanism.

Fig. 21 is a fragmentary top view showing the manner of connecting the cam-rails of the machine, to allow for variations in the distance between the front and rear conveyor sprockets.

Fig. 22 is a perspective view of the cam-rail element shown in Fig. 21.

Fig. 23 is a section taken substantially on line 23—23 in Fig. 21.

Fig. 24 is a fragmentary side elevation showing a slidable, telescopable, supporting rail for the conveyor chains of the machine, which allows for variations in the axial distance between the front and rear conveyor sprockets.

Figs. 25 to 33 are side and end elevations of the various elements shown in Fig. 24.

Fig. 34 is a diagrammatic isometric view showing the arrangement of the cam-rails and racks of the machine.

Fig. 35 is a perspective view of the front cam for the sausage pinching sets.

Figure 1:
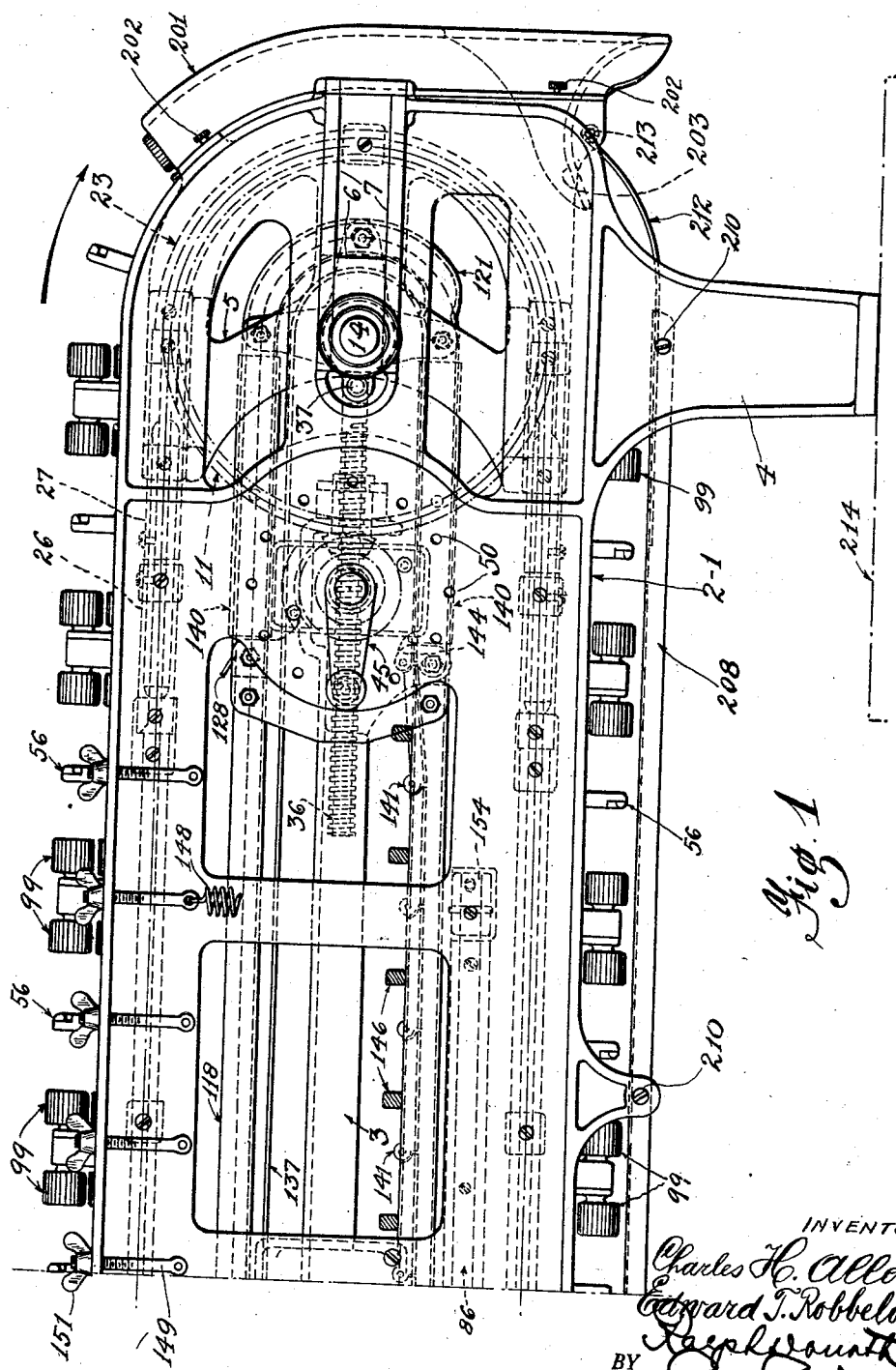
Fig. 1 is an elevation of substantially one-half of the left hand side of the sausage linking machine, showing the feeding end thereof, some parts of the machine being omitted or cut partly away.

Referring to the drawings, the sausage linking machine comprises the right and left hand side-frames 1, 2 secured together in parallel relation by the horizontally disposed spacer-frame 3. Both side-frames have feet 4 by means of which the machine rests on a suitable working table. The side-frames are partly recessed at the feeding end to receive each a sliding-frame 5 (Figs. 9 and 10) outwardly provided with rectangular hubs 6 adapted to slide within the open slots 7 provided in the side-frames.

Rigidly mounted in both slide-frames is the stationary front shaft 8, and rotatably mounted in suitable bearings 9 located at the discharge end of the side-frames is the rear drive-shaft 10. Upon the front shaft are mounted for rotation the front sprockets 11 of the endless conveyor 12. On the rear shaft are keyed, or otherwise secured, the rear sprockets 13 of said conveyor. The front sprockets are lubricated by means of grease-cups 14 and a system of ducts 15 (Fig. 10), and the rear shaft is lubricated by grease-cups 16 (Figs. 5, 6) which feed lubricant to the bearings. The front shaft, respectively the sliding frames 5, are secured in suitable spaced relation with the rear shaft by means of the clamping nuts 17 which are screwed on the threaded extensions 18 on the front shaft; said nuts having flanges 19 bearing on washers 17ª engaging the edges of the slots 7 in the side-frames.

The conveyor systems 12 comprise two endless and parallel roller-chains 20 trained about the front and rear sprockets. To these chains are secured the alternately disposed sausage pinching and sausage twisting sets, the construction of which will be described later. To prevent sagging and undue wear of the conveyor-chains, they are supported throughout by means of chain-guides which comprise the upper and lower straight portions 21, 22 secured to the side-frames and the semi-circular end portions 23, 24 respectively secured to the sliding-frames 5 and the side-frames 1, 2.

The upper guide-portions, as shown especially in Figs. 6 and 24, are substantially L-shaped, i. e. open at the top, to enable the installaton of conveyor-chains in the machine. The lower straight portion, as well as the end sections, are substantially U-shaped in cross-section. These guide-rails have projecting portions or runners 25 upon which the rollers of the conveyor-chains travel.

In order to enable the same machine to twist sausage-links of various lengths, the latter differing generally in the trade by one-half inch steps, it is necessary to make the total length of the conveyor-chains equal to an even multiple of the length of the desired sausage link, so that the same number of sausage pinching and sausage twisting elements may be mounted on the conveyor-chains. For this reason the distance between both sprocket-shafts must be made variable and, in the present embodiment the front sprockets are made adjustable by being mounted on the sliding-frames 5.

The adjustable connection between the straight chain-guide portions 21, 22 and the end portion 23 is illustrated in Figs. 24 to 33 inclusive, which relate only to the upper portions of the chain-guides. However, the lower portions thereof are identical except for the lower straight guide portions which are of channel shaped cross-section.

As shown, the forward end of each stationary top guide-rail 21 and the ends of each semi-circular end portion 23 are connected by an intermediate telescoping guide section comprising an outer sleeve member made of two abutting sections 26, 27 and an inner sleeve 28 positioned within suitably shaped grooves in the outer sleeves. The sleeve portions 26 are secured by screws 29 to the side-frames 1 and 2, and the sleeve portions 27 are fastened by screws 30 to the sliding-frames 5. The inner sleeves are slidable within the outer sleeves an amount limited by the length of the slots 31 cut in the inner sleeve and engaged by stop-screws 32 driven in the outer sleeves.

As shown, the various sleeve members have runners 33 for the rollers of the conveyor-chains which correspond with the runners 25 on the straight sections of the chain-guides. The outer sleeve sections 26 are bevelled at the top, as at 34, to facilitate the entrance of the chain-rollers into the telescoping sections. Also, the forward lower flanges of the outer sections 27 are partly cut away, as at 35, to accommodate the front-sprockets 11 and permit of the easy passage of the conveyor-chains from the straight guide-rails onto the sprockets.

It will be seen from Fig. 24 that when the sliding-frames 5 are moved outwardly to increase the axial distance between the two sets of sprockets, the outer sleeves 27, on account of being secured to said frames will slide along the inner sleeves 28 until the right hand stop screws 32 engage the ends of their corresponding slots 31 in the inner sleeves. Upon further shifting of the sliding-frames, the inner sleeves will move along with them until the stop-screws in the outer sleeve portions 26 strike against the left ends of their corresponding slots in said inner sleeves, which engagement will determine the maximum movement of the sliding-frames.

The shifting of the sliding-frames 5 and of the front-sprockets is effected by means of a screw mechanism shown especially in Figs. 1 and 3. It consists of a non-rotating shift-screw 36 hingedly connected at 37 to a supporting hub 38 freely mounted on the front sprocket-shaft 8, between the two sprockets, Fig. 10. A suitably threaded gear pinion 39 is engaged by said screw and is rotatably mounted in a housing 40 formed at the forward end of the spacer-frame 3. This pinion meshes with a bevel-gear 41 which is secured on a shaft 42 rotatably mounted in suitable bearings 43, 44, respectively provided on the housing 40 and the side-frame 2.

A crank 45 is fastened outwardly to the shaft whereby the latter may be rotated to move the shift-screw longitudinally in either direction. The crank has an enlargement 46 in which is slidably mounted a lock-pin 47 provided with a pull-knob 48 and acted upon by a coil spring 49. This pin is adapted to engage holes 50 arranged in a circle on the side-frame 2, (Fig. 1).

As stated, the numerous sausage pinching and sausage twisting sets are mounted equidistantly on the conveyor 12.

Each sausage pinching set, as shown in particular in Figs. 13 to 16, comprises a yoke-member 51 having at each end a foot 52 in which are secured two special link-pins 53 by means of which the yoke is fastened to the conveyor-chains. These pins are preferably spaced a distance equal to twice the pitch of the conveyor chains in order to provide a larger holding base, thus giving a more rigid assembly. For this reason, each foot is shown with a depression 54 in the middle, to clear the head of the intermediate chain-pin.

Rockably mounted on both sides of the yoke, on a through-pin 55 are the two cooperating pinching elements 56 consisting of pinch-heads 57 having each a bevelled, dished and rounded off portion 58 at the center to reduce the thickness thereof at the point of contact with the sausage-casing. To limit the inward movement of the pinch-heads and thus prevent injury to the casing, each of them is provided on the back with a sector-like stop 57ª which fits within the V-notch of the opposite pinching-head. Each head is at the end of the longer arm 59 of a bell-crank lever; the shorter arm 60 of which is hingedly secured by a pin connection 61 to a connecting link 62. Both connecting links are also hinged by a pin connection 63 to a common rocker-arm 64, rockably supported by means of another pin-connection 65 in the fork 66 of the rocker-post 67.

At the other end of the rocker-arm is rotatably mounted on a pin and washer connection 68 a contact-roller 69, having preferably a curved rim to enable it to operate freely in various angular positions. As seen in the drawings, the rocking movement of the rocker-arm 64 causes the pinch-fingers to swing in opposite directions. Bushings 70 and 71 are used to reduce the wear of the pinch-fingers and of the rocker-arm on their respective pivot-pins.

A sausage twisting set, as shown in Figs. 17 to 20, is composed of a yoke-member 72 terminating at each end with a foot 73 in which special pins 74 are mounted to secure the yoke to the conveyor-chains 20, in a manner already described in relation with the pinching sets. Equally spaced from the middle of the yoke are the bosses 75 upon which are rockably mounted by means of the pin-connections 76 the bell-crank levers 77, each comprising the bifurcated short arm 78 and the long arm 79 having at its outer end an open gear-box 80 closed by means of a screwed on cover 81. At the upper end of the long arm there is provided a bracket 82 having a bushing 83 in which is rotatably mounted the spindle 84 provided at the top with a special rack-gear 85 adapted to engage a gear-rack 86, the construction of which will be dealt with hereafter.

Each spindle is also mounted for rotation in the gear-box in a bushing 87 and in a recess 88 and has securely held thereon a gear-worm 89 which is preferably placed between anti-friction discs 90. This worm drives a large gear 91 rotatable between wearing discs 92 on a shaft 93 supported by the gear-box and its cover. The large gear meshes with two smaller gears 94 each secured centrally, by means of keys 95, on a roller-shaft 96 extending on both sides of the gear-box and cover and resting in bearing sleeves 97 placed in hubs 98 formed on the gear-box and cover.

The outer ends of the roller-shafts are reduced to receive the sausage twisting-rollers 99 mounted thereon in the manner best illustrated in Fig. 20. Each roller comprises a hardwood core 100 engaging the reduced portion 101 of the roller-shaft and secured thereon by means of a threaded nut 102 screwed on the threaded portion 103 and positioned within a recess 104 in the core. Upon the latter is cemented, or otherwise secured, the sausage engaging, preferably outwardly corrugated, sleeve 105 made of suitably resilient material, such as compressed cork, to prevent injury to the sausage-casing and also afford a good frictional engagement therewith. The corners of this sleeve are usually rounded off, as at 106, to prevent cutting or digging into the casing. The sleeve 105 extends inwardly beyond the core 100 and fits snugly over the flat rim of the conically shaped hub 98 to prevent any loose membranes adhering to the sausage-casing from being wrapped around the roller-shaft and interfering with the rotation thereof. Instead of doing this, said membranes will wrap around the smooth neck 107 of the hub, from which they may be easily removed.

It will be seen from Fig. 17 that the roller-shafts on the same gear-box will be rotated in the same direction, and that the shafts on the opposite gear-box will have to be rotated in the opposite direction, in order to produce a rotative or twisting movement of the engaged sausage-link. Also, it will be readily understood that in order to maintain the twists in the sausage-links, it will be necessary to rotate the rollers of each twisting-set in such a manner as to cause the rotation of the sausage-links in alternately opposite directions. Thus, if one sausage-link is rotated clockwise, the two sausage-links at each end thereof will have to revolve counter-clockwise. The alternately opposite rotation of the sausage-links is obtained by making the gear-worms in the twisting sets alternately right and left handed.

The twisting-rollers are brought into or out of engagement with the sausage-links by means of a rocker-lever 108 hinged by means of the pin-connection 109 in the bifurcated rocker-post 110, cast integrally with the yoke. One end of the rocker-lever is forked to receive two connecting-links 111 hinged on a common-pin 112. Each link is connected by a pin-connection 113 to the short arm 78 of its corresponding bell-crank-lever 77. At the other end of the rocker-arm is rotatably mounted on a stationary pin 114 a peripherally curved contact-roller 115 which engages a cam-rail 116, indicated in Fig. 17 in dot and dash lines. A downward rocking movement of this roller will cause the twisting rollers to engage the sausage-link, and an upward movement will bring the twisting rollers into flaring position, as shown in Fig. 17. Stop lugs 117 are provided on the gear-boxes to limit the inward movements of the twisting-rollers, they prevent the rollers on one gear-box from coming in direct contact with the rollers on the other gear-box, thus protecting said rollers against undue wear.

As stated heretofore, the pinch-fingers 56 and the twisting-rollers 99 are brought into sausage engaging and disengaging positions by means of specially constructed cam-rails, best illustrated in Fig. 34.

The cam-rail for the pinch-fingers is composed of the upper straight rail section 118 of L-shaped cross-section, open at the top, and the lower rail-section 119 which is channel-shaped. Both sections are joined at the delivery end by the semi-circular end-cam 120 and at the feeding end to the front cam 121 by means of telescoping sections detailed in Figs. 21, 22, 23 and 35.

Each telescoping section comprises an outer sleeve member 122 of channel-shaped cross-section which is inwardly lined at the top and bottom with guide-plates 123 having on the inside bevelled faces 124. These guide-plates are welded or otherwise secured to the sleeve-member. Longitudinally slidable within the sleeve are the channel-shaped rail-section 125 and the straight portion 121$^a$ of the semi-circular cam-rail 121. The legs of the opposed ends of said last mentioned elements are bevelled as at 126 to correspond with the bevelled faces 124. Each rail section 125 is secured to a lug 3$^a$ on the spacer-frame 3 by means of screws 127 and is upwardly flared at the top, as at 128, to facilitate the entrance of the contact-rollers 69 of the pinching elements. The end section 121 is secured by screws 129 to the arms 130 on the supporting-hub 38.

Secured to the back of the sleeve-member 122 by means of a rivet 131 is a spring-feather 132 bearing against the cam-rail sections 121$^a$ and 125. The purpose of this spring is to hold the bevelled faces 124 and 126 in intimate contact for all longitudinal adjustments of the telescoping parts and to afford thereby a smooth running surface for the contact-rollers 69.

The end-cam 121 is bent into a compound curve comprising a large portion 133 which is concentric with the sprocket-shaft, an intermediate portion 134 which is eccentric to said shaft, and another short concentric portion 135 of lesser radius than the portion 133 and which merges into the straight and horizontal lower cam-rail 121$^a$. There are thus formed in this cam bumps or ridges 136, 136$^a$ over which the contact-rollers must pass, whereby the pinch-fingers are quickly brought into pinching engagement with the stuffed sausage-casing. This pinching will be greatest when the contact-rollers, in their clockwise movement, as seen in Figs. 34, 35, reach the top of the bumps 136, 136$^a$ and the concentric portion 135 of the cam-end.

It will be noted that, as shown in Fig. 34, the lower cam-rail 119 comprises a horizontal portion 119$^a$ and a slightly downwardly inclined portion 119$^b$ which connects with the end of the cam 120. While the contact-rollers 69 run along the horizontal portion 119$^a$, the pinching fingers will exert the maximum pressure imparted to them by the bumps 136, 136$^a$ and the curved portion 135. Upon leaving the portion 119$^a$, the pinch-fingers open up gradually to completely release the casing.

The cam-rail controlling the opening and closing of the twisting-roller sets consists of the upper straight rail section 137 of L-shaped cross-section, the channel-shaped semi-circular end-cam 138, the similarly curved front cam 139 and two telescoping intermediate sections 140 which are constructed like the telescoping sections of the cam-rail for the pinching elements, just described.

However, the lower horizontal portion 141 of the twisting-roller cam-rail is flexible and is made up of channel-shaped link-sections 142 hingedly connected together by pins 143. The front end of this flexible portion is hinged to an anchor 144 secured on the lower rail section 125, and the rear end of said section is hinged to another anchor 145 fastened on the lower leg of the end-cam 138. It will be noted in Fig. 34 that when the contact-rollers 115 emerge from the lower rail section 125, they will engage the bottom side of the flexible section and that upon leaving the latter, they will run within the channel of the end-cam 138.

When the contact-rollers bear against the flexible cam-rail, the twisting-rollers are brought into close clamping engagement with the sausage-links to twist them around. The purpose of making the lower section of the cam-rail flexible is to enable it to adjust itself to variations in the diameter of successive sausage-links, so that the latter will always be properly engaged and twisted by the twisting-rollers.

The required pressure of the twisting-rollers on the sausage-links is obtained by means of transversely disposed pressure-levers 146, Figs. 6 and 7, rockably mounted in supports 147 secured on the underside of the spacer-frame 3. The inner arms 146ª of these levers have downward extensions 146ᵈ which are hinged to the link-pins 143. The outer arms 146ᵇ extend beyond the side-frame 2 and are connected to coil-springs 148 the upper ends of which are attached to eye-bolts 149 suspended from the top flange 150 of the side-frame and provided with wing-nuts 151 whereby the tension in the springs, respectively the pressure of the twisting-rollers on the sausage-links may be regulated. The bights 146ᶜ formed in the outer arms of the levers 146 serve only to clear some vertical ribs provided at certain places in the side-frame. It will be observed, however, that the point of attachment of the spring on each lever is located in line with the theoretical center-line of the lever, to prevent any binding in the support 147.

The length of the links 142 forming the flexible cam-rail is preferably made less than the length of the smallest sausage-link sold in the trade, so that at no time there will be more than one contact-roller 115 on a rail-link. This assures that each set of twisting-rollers will properly clamp its corresponding sausage-link.

The rotation of the twisting-rollers is obtained by the meshing engagement of the rack-gears 85 with the racks 86, Figs. 11, 12 and 34, the length of which is made variable to suit the diameter of the sausage-casing. There are two such racks, each one being properly located on a side-frame to cooperate with the flexible cam-rail and with the cam-rail for the pinch-fingers.

In the present embodiment each rack comprises four sections carried in a suitably grooved rack-base 152 secured by screws 153 to its corresponding side-frame. The first rack-section to be engaged by the rack-gears 85 is indicated by the numeral 154; it is rockably mounted in the rack-base on a pivot-pin 155 and is acted upon by two coil-springs 156 nested partly in said base. The purpose of yieldingly mounting this first rack-section is, of course, to facilitate the meshing engagement of the rack-gear with the first teeth of the rack. The second, and longest, rack-section 157 is securely held in the rack-base by screws 158.

The last two rack-sections 159 and 160 are transversely movable into or out of alignment with the other rack-sections, respectively in or out of engagement with the rack-gears. This transverse movement is obtained by means of a shift-wedge 161 which is guided within the grooved rack-base and which has suitably located bevelled faces 162, 163 and 164 adapted to engage correspondingly bevelled surfaces 165 to 168 provided at both ends and at the back of the rack-sections 159 and 160. The intermediate portions of said racks, between the bevelled ends, are recessed, as at 169, 170, to accommodate the raised bearing surfaces 171 and 172 on the shift-wedge. The latter is supplied with a push-pin 173 slidable within a slot 174 in the base.

Figure 2:
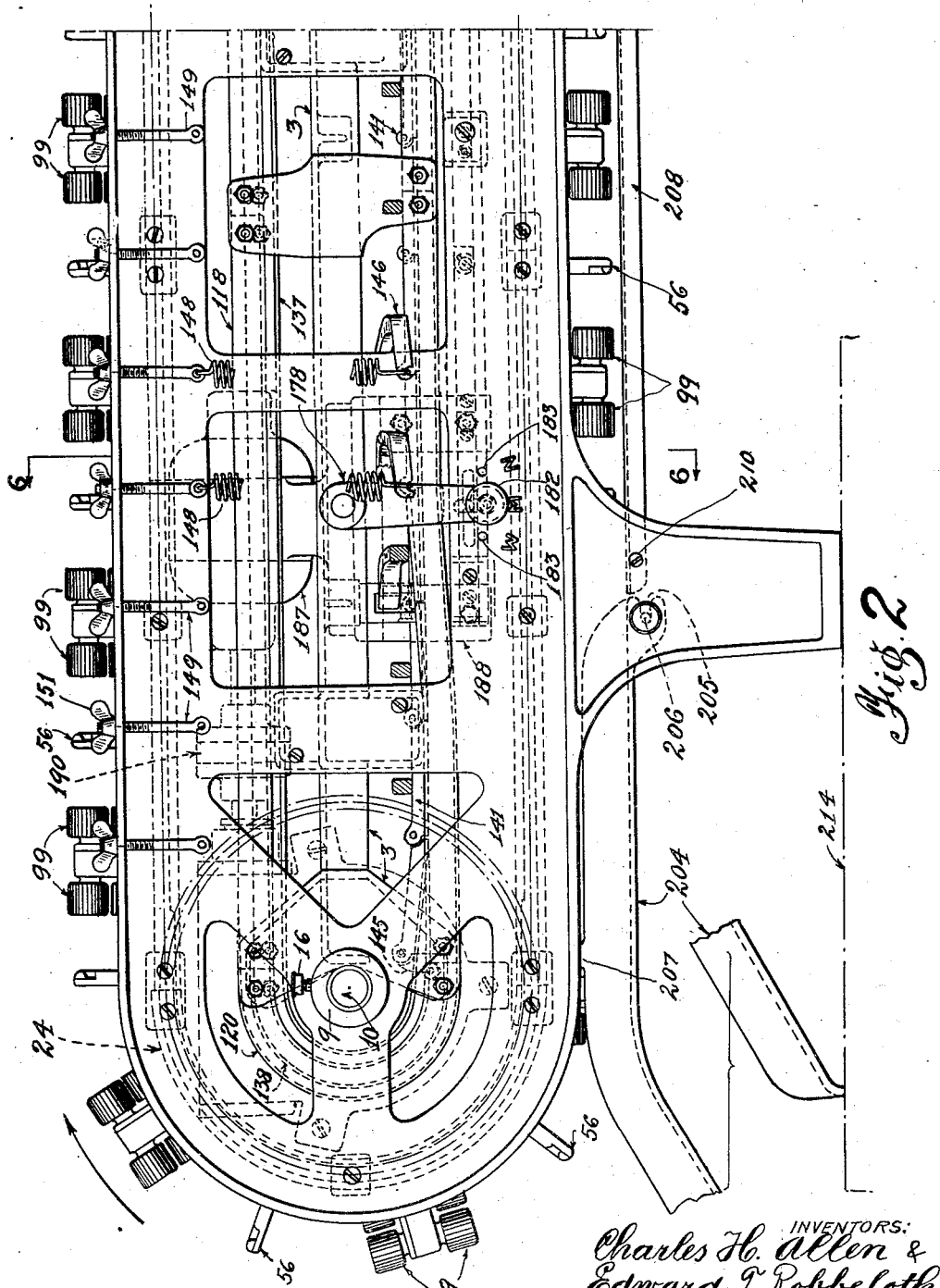
Fig. 2 is a side elevation of the remaining portion of the machine showing the discharge end thereof, some parts being also omitted or partly cut off.

The push-pin of the right hand rack engages a slot 175 cut in a lever 176 (Fig. 6) and the push-pin of the left-hand rack engages a similar slot 175ª in the leg 177 of the bifurcated rack operating lever 178 which is secured, in common with the lever 176, on a through shaft 179 rotatably mounted in bearings 180 furnished on the spacer-frame 3. At the end of the leg 181 of the lever 178 is a spring lock-pin 182 of identical construction and size as the lock-pin 47 and which is adapted to engage either one of three apertures 183 identified in Fig. 2 by the letters M, N, W which refer to "medium", "narrow" and "wide" casings or sausage-links.

The movable rack-sections 159 and 160 are held yieldingly within the rack-base by means of screws 184 movable within counter-bored apertures 185 and acted upon by coil-springs 186.

It is customary to give all types of sausages handled by this machine aproximately the same number of twists, generally from 4 to 6 turns, regardless of the diameter thereof. Hence, if the stuffed casing fed into the machine is of large diameter, the operating lever is set on the letter "W"; that is, the shift-wedge 161 is moved fully to the left (Figs. 2 and 11), whereby both rack-sections 159 and 160 are brought into line with the long rack section 157. Therefore, the rack-gears will be rotated a greater amount, sufficient to compensate for the larger diameter of the casing.

Conversely, if the sausage-casing is small in diameter, the operating lever is locked in the position "N", whereby the shift-wedge is pushed fully to the right and the bevelled surfaces of both racks 159, 160 are brought down on the bevelled surfaces of the shift-wedge, by the action of the springs 186. This reduces the total length of the rack by an amount equal to the aggregate length of both movable rack portions. If in this case the racks were not shortened, the small casings would be twisted too much, thus creating an excessive compacting of the meat in the sausage-links liable to burst the thin casings used for this kind of sausages.

The condition shown in Fig. 11 corresponds to the intermediate position of the racks, for medium sized sausages, obtained by locking the operating lever in the aperture at "M".

The upper cam-rail sections 118 and 137 are L-shaped, i. e. open at the top, to enable the insertion in, or removal from, the machine of conveyor-chains on which the pinching and twisting sets are variously spaced to produce sausage-links of the desired length.

The driving power for the sausage linking machine is preferably derived from an electric motor 187 mounted on a bracket 188 secured by bolts 189 to the side-frame 1. As shown particularly in Figs. 4 and 5, the shaft of this motor is connected by means of a flexible coupling 190, of any desired and suitable design, to a worm-shaft 191 mounted in anti-friction bearings 192 located in the upper part of a gear housing 193 fastened by screws 194 to the side-frame. This shaft passes through a stuffing box 195 which prevents the escape of the lubricant within the gear housing.

The worm 196 meshes with the gear 197 keyed and bolted upon a transverse stub-shaft 198 rotatably mounted in a bearing 199 provided on the gear housing. This stub-shaft is connected by means of a one-way clutch 200, of any desired type, to the rear drive shaft 10 of the machine.

The purpose of the one-way clutch is to enable an attendant to feed by hand the fully assembled conveyor chains onto the sprockets without turning the electric motor and its reduction gearing. The rotation by hand of the rear sprockets could not be performed without disconnecting the drive-shaft 10 from the stub-shaft 198, on account of the worm gear drive being practically self locking when its rotation is attempted by applying force to the sprockets 13, respectively the drive-shaft 10.

At the front end of the machine there is provided a feeding shield 201 removably secured to the slide-frames by means of screws 202. This shield has an inwardly projecting feeding-spout or trough 203 which receives and guides the stuffed sausage-casings into position to be engaged by the pinching and twisting sets. This shield also serves as a protective guard for the front sprockets and the conveyor.

The twisted sausage-links fall at the discharge end upon an unloading pan 204 removably secured by means of a slot connection 205 and a through rod 206. The inner portion of this pan is level and straight while the outer portion is flared outwardly and slopes down to rest upon the table 214 upon which the machine is installed. The pan is also used as a lifting means for the whole machine at the discharge end, and for this reason, lugs 207 are cast on the sides of the pan to bear against the underside of both side-frames.

Any drippings, such as meat, water, etc., from the sausages fall upon a drip-pan composed of a straight portion 208 of channel-shaped cross-section (Figs. 1, 2 and 6) supported on transverse rods 209 secured by screws 210 to the side-frames. Spacer sleeves 211 are also shown to maintain the drip-pan in proper position on the machine. The front end of the drip-pan is slidable and is made up of a suitably bent piece 212 of sheet metal secured at the upper end to a transverse rod 213 fastened to the slide-frames 5. The lower end rests freely on the first transverse rod 209 beneath the straight portion of the drip-pan. As will be understood, this telescoping arrangement allows for longitudinal adjustment of the front sprockets.

The operation of the machine will now be described by following the performance of a group of pinching and twisting elements, reference being had in particular to Figs. 1, 2, 34 and 35; it being assumed that a fully equipped conveyor to produce the desired length of sausages be installed on the machine and that the motor be operating the conveyor in the direction indicated by the arrows.

The operator lays a previously stuffed sausage-casing into the feeding-trough 203 and pushes the former in position to be engaged by the first downwardly moving pinching set. While traveling along the upper cam-rail section 118 and partly within the front end cam 121, this pinching set is held open, i. e. in position to straddle the sausage casing. However, as the contact-roller 69 of the pinching set enters into the intermediate portion 134 of the cam 121 the pinch-fingers begin to close gradually on the casing and reach their tightest grip rather rapidly as the roller passes by the ridges 136, 136ª. From this point on the contact-roller follows the concentric curve 135 of the end-cam and then the horizontal portion of the lower cam-rail 119, thus maintaining the maximum grip of the pinchers on the casing. As the roller engages the inclined portion 119ᵇ of the lower cam-rail, the pinch-fingers open up gradually until they reach again their full open position shortly before the roller enters the rear end cam 120.

The first pinching set is, of course, followed by a twisting set, the rollers of which will remain in open position while the contact-roller 115 travels along the cam-rail sections 137, 140 and 139. When this roller leaves the lower cam-rail section 125 it engages the underside of the flexible cam-rail 141, thus causing the rollers to close on the sausage-casing, shortly after the latter has been pinched. As stated before, the pressure of the twisting-rollers may be suitably regulated by adjusting the tension of the springs 148 acting on the pressure-levers 146. A slight advance of the conveyor brings the rack-gears 85 of the twisting set into mesh with the rack 86 by first engaging the rockable section 154 and then as many of the other rack-sections as required by the diameter of the sausage casing.

Upon leaving the flexible cam-rail, the contact-roller 115 enters the end cam 138 which causes the twisting rollers to release the sausage-link. The first set of twisting-rollers is, of course, succeeded by another set of pinchers, and so forth.

The grip of the pinchers is strongest just before the twisting-rollers come into action to properly define the dividing line between the sausage-links, this grip is then gradually lessened, after the first twist of the sausage-links in order to enable the meat which is displaced in the sausage-links during subsequent twisting to find its place without bursting the casing.

It will be noted that the downwardly moving pinching sets describe an arc before engaging the casing and that the chord or pitch between two sets of pinchers is greater on this arc than the normal pitch, as measured on a straight line. Therefore, when a sausage-link is gripped between two pinchers, it will slightly sag when first moving along the straight lower portions of the cam-rail. This excess length of the sausage-link, so-called twisting-stock, will be absorbed during the subsequent twisting operation and will also assist in the proper distribution of the displaced meat in the sausage-links.

The fully twisted sausage links are dropped at the discharge end on the delivery-pan 204 and then slide down on the working table 214, whence they are removed by an operator.

Each machine may be supplied with various sets of fully assembled conveyors upon which the pinching and twisting sets are suitably spaced to produce sausage-links of the desired length.

To change conveyors, the operator opens up both conveyor-chains by extracting a removable link-pin (not shown) provided in each chain. The so opened conveyor may then be pulled through the machine and lifted out from the top thereof, the top portions of the chain-guides and cam-rails being made open for that purpose, as fully explained heretofore. The new conveyor, while still open, is then laid in the open top portions of the chain-guides and cam rails and then pushed by hand toward the front sprockets 11 which will automatically engage the conveyor chains 20 and feed them around the machine without turning the electric motor and its reduction gearing, because of the use of the one-way clutch 200. When the complete conveyor has thus been fed into the machine, the loose ends of the conveyor chains are connected together with the above mentioned removable link-pins, to form an endless structure.

As will be understood, there may be slight changes made in the construction and arrangement of the details of this invention without departing from the field and scope of the same, and we intend to include all such variations, as fall within the scope of the appended claims, in this application in which the preferred construction of the invention has been disclosed.

We claim:

1. In a sausage linking machine, a unitary conveyor system having means mounted exclusively thereon to forwardly feed a stuffed sausage-casing, to divide same into sausage-links and to twist said links, said means comprising a plurality of sausage pinching and sausage twisting sets mounted alternately and equidistantly on said conveyor; individual cam-rail systems effective on said pinching and twisting sets to bring same into and out of engagement with the stuffed sausage casing to be linked; power means to operate said conveyor; a supporting-frame structure for said conveyor, and cam-rails longitudinally adjustable to accommodate conveyors of various lengths, and means to lock said frame into adjusted position.

2. In a sausage linking machine, a removable unitary endless conveyor system having means mounted exclusively thereon to forwardly feed a stuffed sausage-casing, to divide same into sausage-links and to twist said links, said means comprising a plurality of sausage pinching and sausage twisting sets mounted alternately and equidistantly on said conveyor; individual cam-rail systems effective on said pinching and twisting sets to bring same into and out of clamping engagement with the stuffed sausage casing to be linked; a system of racks operative on the sausage twisting sets to rotate same; means to vary the effective length of said racks; a supporting frame structure for said conveyor, cam-rails and racks, and power means mounted on the frame structure to operate said conveyor system.

3. In a sausage linking machine, a removable endless conveyor system; a plurality of sausage pinching and sausage twisting sets mounted alternately on said conveyor; individual cam-rail systems effective on said pinching and twisting sets to bring same into and out of clamping engagement with the stuffed sausage-casing to be linked; a pair of racks operative on the sausage twisting sets and adapted to rotate alternate twisting sets in opposite directions; a supporting frame structure for said conveyor, cam-rails and racks; means to vary the effective length of each rack, and power means to operate said conveyor system.

4. In a sausage linking machine, a removable endless conveyor system; a plurality of sausage pinching and sausage twisting sets mounted alternately on said conveyor; individual cam-rail systems effective on said pinching and twisting sets to bring same into and out of clamping engagement with the stuffed sausage casing to be linked; a pair of racks operative on the sausage twisting sets and adapted to rotate alternate twisting sets in opposite directions; a supporting frame structure for said conveyor, cam-rails and racks; unitary means to vary simultaneously the effective length of each rack, and power means to operate said conveyor system.

5. In a sausage linking machine, a removable endless conveyor system; a plurality of sausage pinching and sausage twisting sets mounted alternately on said conveyor; individual cam-rail systems effective on said pinching and twisting sets to bring same into and out of clamping engagement with the stuffed sausage casing to be linked; a pair of racks operative on the sausage twisting sets and adapted to rotate alternate twisting sets in opposite directions; a supporting frame structure for said conveyor, cam-rails and racks; unitary means to vary simultaneously the effective length of each rack; means to hold the racks into adjusted position, and power means to operate said conveyor system.

6. In a sausage linking machine, a conveyor system comprising two endless chains disposed in parallel spaced relation; end sprockets for said chains; a plurality of sausage pinching and sausage twisting sets mounted on said conveyor; a telescopable guide-rail for each endless chain; individual telescopable cam-rail systems effective on said pinching and twisting sets to bring same into and out of engagement with the stuffed casing to be linked; power means to operate said conveyor; a supporting frame structure for said conveyor, cam-rails and power means; said frame structure being longitudinally adjustable to vary the axial distance between said end sprockets.

7. In a sausage twisting machine of the character described, a frame structure; a discharge-pan removably fulcrumed at one end thereof to said frame structure and resting at the other end upon the supporting means of said machine; said pan having portions positioned intermediate the ends thereof adapted to engage said frame, whereby the latter may be lifted by the pan.

8. In a sausage twisting machine of the character described, a frame structure; a discharge pan comprising a substantially horizontal section removably fulcrumed at its outer end to said frame structure and a rigidly connected downwardly inclined section resting at its outer end upon the supporting means of said machine, said pan having portions positioned on the horizontal section thereof adapted to engage said frame, whereby the latter may be lifted by the pan.

In testimony whereof we affix our signatures.

CHARLES H. ALLEN.
EDWARD T. ROBBELOTH.